Figure 1:
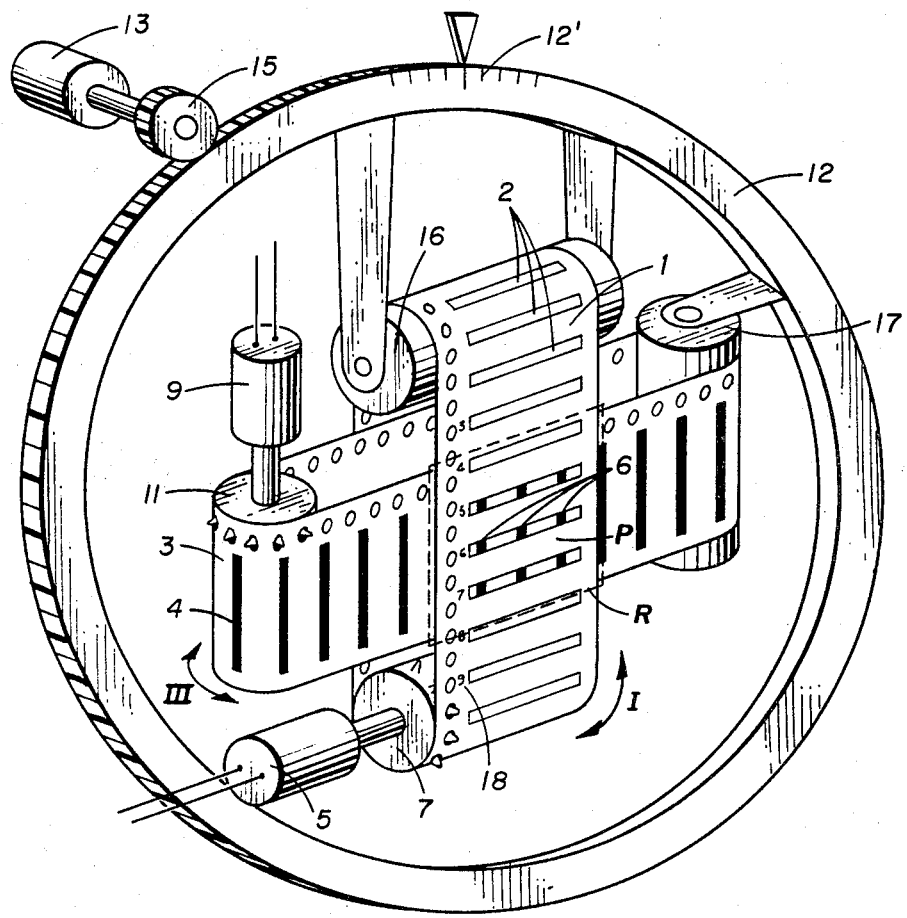

Sept. 10, 1968  G. KWASNIEWSKI ET AL  3,400,686

METHOD OF AND APPARATUS FOR INDICATING POSITION AND MOVEMENT

Filed Dec. 21, 1964

GEORGE KWASNIEWSKI
JOHN W. SENDERS
INVENTORS

BY Rines and Rines
ATTORNEYS

United States Patent Office 3,400,686
Patented Sept. 10, 1968

---

3,400,686
METHOD OF AND APPARATUS FOR INDICATING POSITION AND MOVEMENT
George Kwasniewski, Wellesley, and John W. Senders, Lincoln, Mass., assignors to Bolt Beranek and Newman Inc., Cambridge, Mass., a corporation of Massachusetts
Filed Dec. 21, 1964, Ser. No. 419,975
10 Claims. (Cl. 116—129)

The present invention relates to methods of and apparatus for indicating relative movement and, more particularly, in a class of important applications thereof, for indicating the reference position and attitude (and/or rate) of vehicles operating in three-dimensional space.

Numerous types of indicators have been evolved and used throughout the years for problems of the above-mentioned nature, including so-called ball- or sphere-type aircraft indicators wherein the operator views calibrated lines provided upon a sphere for determining reference location and attitude. Other instruments for such purposes have involved a plurality of meters and other indicator devices, non-coordinated with one another, controlled by transducers of various sorts that sense attitude and other characteristics of the vehicles. The latter type of indicators, of course, requires complicated equipment, is expensive to manufacture and difficult to maintain, presenting, also, difficulty in interpretation by the operator especially under conditions of space travel, supersonic flight, and other difficult maneuvering operation. The former type of indicator involving the ball or sphere also presents problems in interpretation and, in addition, particularly when the sphere becomes moved towards the poles where spaced points along parallels of latitude converge, introduces serious limitations in accuracy of reading.

An object of the present invention, accordingly, is to provide a new and improved method of and apparatus for indication that shall be subject to none of the above-described disadvantages—neither to the reduction in accuracy inherent in sphere-type indicators, nor to the complexity of equipment and difficulty of interpretation experienced with other types of indicating systems. To the contrary, in accordance with the present invention, a highly simplified and extremely readily interpreted indicating method and apparatus are provided. In summary, the apparatus involves the utilization of first and second juxtaposed crossed tapes that are independently driven along different intersecting predetermined directions and that are each provided with a plurality of spaced lines oriented to intersect at the region of crossing of the tapes in a plurality of spots, the apparent movement of which may be readily followed and interpreted by the operator to determine such factors as position and movement or attitude. The "lines" of the overlying tape are elongated light-transmitting areas and the "lines" of the underlying tape are elongated bands, the term "bands" being used merely to distinguish from the "areas" of the overlying tape.

A further object is to provide a new and improved indicator apparatus of more general utility, as well.

Other and further objects will be explained hereinafter and will be more particularly pointed out in connection with the appended claims.

Figure 2:
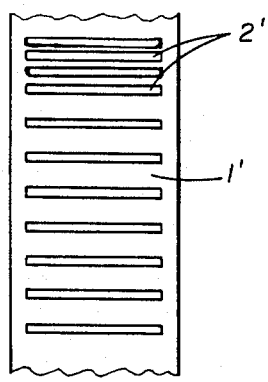
Figure 3:
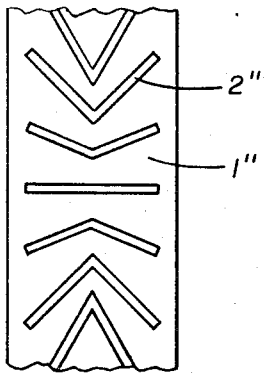

The invention will now be described with reference to the accompanying drawing, FIG. 1 of which is a schematic isometric view of a preferred embodiment of the invention applied for illustrative purposes to the problem of reference and attitude indication, though the principles thereof are clearly applicable to indicating other parameters in other applications than this type of vehicle indicator; and FIGS. 2 and 3 are fragmentary views of modified tape structures.

Underlying the invention is a psychological phenomenon brought into play when each of a pair of sets of spaced lines is moved past one another in such a manner as to create in the region of crossing a plurality or field of spaced spots defining the crossing points of the respective sets of spaced lines, the lines of the tape closer to the observer being light-transmitting to permit the spots to be viewed. To the observer, as one of the sets is moved backward or forward along its direction of movement, this field of spots appears to move in the direction of such movement; and, as the other set is moved backward or forward along its direction, the field of spots similarly appears to move backward or forward along that direction. In addition, if both sets of lines are moved along their respective directions, the field of spots appears to move along the vector sum of such movements. Rotation of the intersecting sets of lines about an axis orthogonal to the two directions of movement of the sets of lines brings to the operator the illusion of the corresponding rotation of the set of spots. The invention is, accordingly, in one of its broadest aspects, directed to the application of this discovered psychological response to practical indicator apparatus.

Referring to FIG. 1, two closed substantially cylindrical loop tapes are respectively shown at 1 and 3, disposed respectively to rotate in the north-south (pitch) direction indicated by arrow I, and in the orthogonal east-west direction (azimuth), indicated by arrow III. The tape 1 is provided with a plurality of slots, light-transmitting linear slits, transparent strips, or equivalent indicia 2, all hereinafter generically referred to by the phrase, "a plurality of spaced lines," or a plurality of space light-transmitting elongated areas shown in FIG. 1 as the parallel, substantially horizontally disposed lines 2. The tape 3 is also provided with a plurality of spaced vertical lines 4, hereinafter generically referred to by the phrase, "a plurality of spaced elongated bands." As will appear more fully hereinafter, lines 4 may be opaque or light-transmitting, while lines 2 are light-transmitting. The word "tape" is employed herein in its very broadest sense to refer generically to any desired carrier for the lines or indicia 2, including, but not limited to, belts, strips, photographic film, and other well-known media.

The tape 1 may be driven along the direction of the arrow I in response to a signal applied from, for example, a pitch motor or other driving device 5, in the case of the illustrated example of a vehicle movement indicator, which may communicate such motion through a sprocket 7 to the inner perforated periphery of the tape 1. This may, for example, be used continually to orient the tape 1 in accordance with the particular pitch of the vehicle in which the indicator device is mounted. Similarly, the tape 3 may be driven in the direction of the arrow III in response to an azimuth motor or other driving device 9, communicating through a sprocket 11 with the perforated periphery of the tape 3. It will be observed that, in the embodiment of FIG. 1, the horizontal lines 2 of the tape 1 are substantially parallel to the azimuthal direction of driving of the other tape 3, and that the vertical lines 4 of the tape 3 are substantially parallel to the vertical pitch direction of driving of the other tape 1.

In the region R of crossing of the juxtaposed tapes 1 and 3, the points of intersection of the plurality of spaced lines 4 (which in this case may be solid markings) with the plurality of spaced lines 2 of the tape 1 (which in this case may be slots) are visible as a plurality or field of spots 6 which may be viewed through the light-transmitting lines 2 within the display or indicator region R. The spots, being the intersections of the spaced lines 2 and 4, are thus seen as discrete points on a background of substantially greater area than that occupied by the spots, as shown in FIG. 1. The observer, because of the phenomenon before discussed, will gain the impression that this field or plurality of spaced spots 6 in the display region R moves upward or downward when the tape 1 is moved upward or downward in response to action of the pitch motor 5, to the left or right when the tape 3 is thus driven by the azimuth motor 9, and, in general, along a direction corresponding to the vector sum of the movements of tapes 1 and 3, thus providing an indication of the actual movement and attitude of the vehicle in space.

In addition, if the system or support carrying this apparatus, shown as a roll ring 12, is rotated about an axis orthogonal to the horizontal and vertical directions of movement of the tapes 1 and 3, as in response to a roll motor 13 driving a roll gear 15 engaging the ring 12, the observer gains the impression that the plurality of spots 6 rotates clockwise or counterclockwise along this third dimensional axis, as well. In the actual instrument, the ring 12 may serve to support idler sprockets 16 and 17 over which the tapes 1 and 3 may be mounted.

While the invention has been illustrated as applied to the particular problem of reference and attitude indication in a vehicle, it is evident that such apparatus is equally useful in many other related applications, including among others, indicators for supersonic aircraft attitude, glid path indicators, helicopter precision hovering indicators, underwater craft maneuvering indicators, navigational display indicators, and X–Y plotters, to mention but a few.

It will also be evident that instead of using a plurality of lines 4 in the form of opaque markings to cooperate with a plurality of lines 2 in the form of slots to produce the field of spots 6, other types of line indicia may also be employed. As a further example, the plurality of lines 4 may also be in the form of slots on an otherwise opaque tape 3, with a light source placed behind the tapes to produce light spots at 6. Convenient apparatus of this type has been constructed and successfully operated by forming the tapes 1 and 3 from photographic film upon which were photographed the patterns of the plurality of lines 2 and 4 such that the tapes were opaque except for the sets of lines 2 and 4. Successful indicator apparatus of this type has also been constructed and operated from 2¼″ translucent instrumentation tape of the type marketed by Gentape Corporation of Bloomfield, N.J., such tape being opaque except for the pattern of lines 2 and 4. The tests performed with this apparatus, used for the purpose of indicating reference and attitude, indicated that low-threshold perception of the motion by the observer is less than .05 degree per second. This favorably corresponds with precision gyro and other rate instruments now in use and demonstrates the efficacy of the indicator of the present invention despite its extreme simplicity.

Clearly, other types of optical techniques may be used to produce the pluralities of lines 2 and 4 and the effect of spots or other types of indicia 6, including the use of cross-polarized strips and the like, without departing from the spirit and the scope of the underlying invention. It has also been determined that if the lines 2 and/or 4 are not substantially uniformly spaced from one another, as shown in FIG. 1 (which is useful in many applications), but have their spacing successively varied in accordance with some predetermined law, an absolute reference of position and direction of movement can be attained. As an illustration, if the lines 2 are progressively spaced closer and closer together near the top, as at 2′ in the tape 1′ of FIG. 2, the field of spots 6 will appear more closely organized when the pitch is downward than when it is upward. Similarly, the design of diverging or V-shaped slots shown at 2″ in FIG. 3, wherein the lines are of successively changing divergence, will enable the observer to orient the position and direction of movement from a fixed reference.

If desired, visual indication of the roll may be provided by calibrations on the ring 12, as shown at 12′, and pitch calibrations along the edge region 18 of the tape 1. Azimuth readings may be provided by means of an additional narrow tape containing the azimuth calibrations (not shown), rotated synchronously by the sprocket 11 in front of the pitch tape 1 in the direction of azimuth. Reference data may also, of course, be projected upon the field of spots 6 for superimposed readings; as, for example, the projection at P (FIG. 1) of an arrow or other indicia representing the direction of a control mechanism for the vehicle, and that may be simply alined by the operator, vehicle, and may be simply aligned by the operator, through adjustment of the control, into parallelism with the direction of movement of the field of spots 6.

If, moreover, the driving mechanisms 9 and 5 are controlled in accordance with the rate of yaw or pitch, a rate indicator is thus provided, presenting a composite or vector display of the rates of vehicle motion.

As another example of the versatility of the invention, if the tapes 1 and 3 are substantially orthogonally oriented with respect to one another and either tape is tilted out of its respective vertical or horizonal planes with respect to the other tape, the plurality of spaced spots 6 which would normally define the corners of vertical rectangles will be observed to incline at angles that are measures of the angle of deviation of the plane of the tapes.

While the tapes 1 and 3 have been shown in the form of cylindrical closed loops, it is to be understood that other configurations may also be used, including flat, substantially parallel, plane intersecting tapes. An array of photosensitive transducers may also be employed to sense the directions of movement of the plurality of spots 6 and the concentration of the same in the event of the use of unequally spaced lines, as well.

Further modifications will also occur to those skilled in the art and all such are considered to fall within the spirit and scope of the invention as defined in the appended claims.

What is claimed is:

1. An indicator apparatus having, in combination, a support, a first tape, a second tape juxtaposed beneath said first tape, a first means mounted on said support movably mounting said first tape on said support, a second means mounted on said support and angularly disposed from said first means movably mounting said second tape on said support, a first drive means operatively connected to said first mounting means for driving said first tape in a first predetermined direction, a second drive means operatively connected to said second mounting means for independently driving said second tape in a second predetermined direction intersecting said first tape, said first tape having a plurality of spaced light-transmitting elongated areas distributed therealong and oriented at an angle to the first predetermined direction, said second tape having a plurality of spaced elongated bands distributed therealong and oriented to intersect with said light-transmitting areas to define a plurality of spaced spots in the region of the crossing of said tapes, said spot being visible through said light-transmitting areas as discrete points on a background of substantially greater area than that of said spots, whereby movement of said tapes by said first and second drive means creates the illusion of movement of said spots along a direction corresponding to the vector sum of the movements of said tapes.

2. Apparatus as claimed in claim 1 and in which the said first and second predetermined directions are substantially orthogonal to one another.

3. Apparatus as claimed in claim 1 and in which said plurality of elongated areas and said plurality of elongated bands are constituted of substantially equally spaced parallel areas and bands, respectively, and in which said areas are oriented along said second predetermined direction and said bands are oriented along said first predetermined direction.

4. Apparatus as claimed in claim 1 and in which at least said spaced areas or said spaced bands are variably spaced along the respective tape.

5. Apparatus as claimed in claim 4 and in which said spaced areas are substantially V-shaped and of successively changing divergence.

6. Apparatus as claimed in claim 1 and in which the tapes are formed into closed loops.

7. Apparatus as claimed in claim 1 and in which said elongated bands are light-transmitting.

8. Apparatus as claimed in claim 1 and in which said support comprises a roll ring.

9. Apparatus as claimed in claim 1 and in which means is provided for indicating the angular position of at least said spaced areas or said spaced bands.

10. Apparatus as claimed in claim 1 and in which means is provided for superimposing further data upon the said region for correlation with the movement of said spots.

References Cited
UNITED STATES PATENTS

| | | | |
|---|---|---|---|
| 1,500,642 | 7/1924 | Saldinger | 235—86 |
| 2,130,224 | 9/1938 | Boykow | 40—42 |
| 2,218,929 | 10/1940 | Kenyon | 33—204 |
| 2,746,419 | 5/1956 | Serge | 116—124.1 |
| 2,754,605 | 7/1956 | Berkeley | 40—31 |
| 2,790,411 | 4/1957 | Padgett | 116—124.1 |
| 2,817,271 | 12/1957 | Roy | 40—86 |
| 2,947,101 | 8/1960 | Barry | 40—61 |
| 3,176,265 | 3/1965 | Schweighofer | 340—27 |

LOUIS J. CAPOZI, *Primary Examiner.*